United States Patent [19]

Feth et al.

[11] Patent Number: 4,717,225
[45] Date of Patent: Jan. 5, 1988

[54] FORM POLARIZING FIBERS AND METHOD OF FABRICATION

[75] Inventors: John R. Feth, Topanga; Chin-Lung Chang, Woodland Hills, both of Calif.; Steven C. Furlong, Fanwood, N.J.

[73] Assignee: Litton Systems, Inc., Beverly Hills, Calif.

[21] Appl. No.: 734,211

[22] Filed: May 15, 1985

Related U.S. Application Data

[63] Continuation-in-part of Ser. No. 659,804, Oct. 11, 1984, abandoned.

[51] Int. Cl.$^4$ .............................. G02B 6/18; G02B 6/22
[52] U.S. Cl. ............................... 350/96.33; 350/96.30
[58] Field of Search ............... 350/96.29, 96.30, 96.31, 350/96.32, 96.33, 96.34

[56] References Cited

U.S. PATENT DOCUMENTS

| | | | |
|---|---|---|---|
| 4,206,967 | 6/1980 | Onoda et al. | 350/96.33 |
| 4,298,245 | 11/1981 | Aulich et al. | 350/96.21 |
| 4,372,646 | 2/1983 | Strahan et al. | 350/96.31 |
| 4,465,336 | 8/1984 | Huber et al. | 350/96.30 |
| 4,494,969 | 1/1985 | Bhagavatula | 65/3.12 |
| 4,529,426 | 7/1985 | Pleibel et al. | 65/3.11 |
| 4,549,781 | 10/1985 | Bhagavatula et al. | 350/96.30 |
| 4,552,578 | 11/1985 | Anderson | 65/29 |
| 4,557,742 | 12/1985 | Thigpen | 65/2 |
| 4,561,871 | 12/1985 | Berkey | 65/3.11 |
| 4,575,187 | 3/1986 | Howard et al. | 350/96.33 |
| 4,589,728 | 5/1986 | Dyott et al. | 350/96.30 |

OTHER PUBLICATIONS

Fujii, Y., "Optical Fibers with Very Fine Layered Dielectrics", *Applied Optics,* vol. 25, No. 7, pp. 1061–1065.
Okoshi, T., "Single-Polarization Single-Mode Optical Fibers", *IEEE J. of Quantum Electronics,* vol. QE-17, No. 6, Jun. 1981.
Tateda et al., "Optical Wave Propagation in Form-Birefringent Media and Waveguides", IEEE, 1983.

*Primary Examiner*—William L. Sikes
*Assistant Examiner*—Akm E. Ullah
*Attorney, Agent, or Firm*—Lynn & Lynn

[57] ABSTRACT

A polarizing optical fiber has a core formed of a plurality of layers of dielectrics having different refractive indices. The dielectric layers form a composite structure having different refractive indices for light of different polarizations. The differing refractive indices cause the polarization states of light guided by the fiber to be non-degenerate so that energy ordinarily will not couple from one polarization to the other. The fiber includes a cladding that may have a refractive index either less than both core indices to provide a polarization maintaining fiber or greater than or equal to one of the core indices to provide a polarizing fiber. The method of fabrication of the layered core form birefringent optical fiber includes forming a structure of a plurality of layers of the dielectrics, heating the structure to form a monolith, stretching the monolith to form the fiber core, and adding the cladding to the core.

14 Claims, 8 Drawing Figures

FORM POLARIZING FIBERS AND METHOD OF FABRICATION

CROSS-REFERENCE TO RELATED APPLICATION

This is a continuation-in-part of applicants' copending application Ser. No. 659,804, filed Oct. 11, 1984 for FORM BIREFRINGENT FIBER AND METHOD OF FABRICATION now abandoned.

BACKGROUND OF THE INVENTION

This invention relates generally to fiber optic waveguides and particularly to fiber optic waveguides whose cores have two refractive indices and, still more particularly, to form birefringent optical fibers for propagating a single mode of optical energy in a defined polarization.

Wave behavior in layers of materials having different refractive indices optically and periodically stratified differs from that in a uniform medium. If the thickness of each layer is sufficiently small compared to the light wavelength and the number of layers is sufficiently large, the compound medium is birefringent. Form birefringence occurs in an ordered arrangement of layers of optically isotropic materials having dimensions large compared with the molecules of the materials, but small compared to the optical wavelength in the fiber. Fiber optic devices using form birefringent fiber are useful in constructing gyroscopes, sensors, frequency shifters and communications systems.

Problems arise in using ordinary fibers to form the above listed devices. Strictly speaking, an ordinary axially symmetrical single mode fiber is a "two-mode" fiber because it will propagate two orthogonally polarized $HE_{11}$ modes. Each polarization has a propagation constant, but in an ordinary optical fiber the two propagation constants are so nearly identical that degeneracy results. Geometrical perturbations in the fiber cause polarization state instability when two orthogonal polarizations exist. Propagation of degenerate polarization states also causes polarization mode dispersion, which occurs because the two polarization modes have slightly different velocities. Polarization instability and mode dispersion degrade performance of optical fibers in some applications of single-mode fibers to communications and measurement systems.

In an optical communication system, the received signal level fluctuates when the receiver is sensitive to the polarization. This fluctuation occurs when an optical integrated circuit is used in the receiver and in heterodyne-type optical communications systems. Polarization instability manifests itself in optical interferometric systems in a manner analogous to signal fading in classical communications systems.

Slight elliptical deformation of the fiber may exist even when a fiber is designed to be axially symmetrical. Ellipticity separates the propagation constants of two orthogonally polarized $HE_{11}$ modes, which otherwise are degenerate with each other, and causes polarization mode dispersion delay.

Single-polarization single-mode (SPSM) optical fibers were developed to prevent the adverse effects of polarization instability. Three basic types of the SPSM fiber are the elliptical-core fiber, the stress induced birefringent fiber, and the side-pit fiber.

Previous attempts to provide polarization stability have employed one of several methods of maximizing the differences between the propagation constants of the two polarization modes. Elliptical core fibers provide an asymmetrical propagation constant distribution to provide the required difference in propagation constant. Application of an asymmetrical stress distribution by bending a fiber will achieve the same result.

Elliptical core fibers are not practical because producing the desired birefringence in this manner increases the transmission loss to unacceptably high values and because of attendant difficulties in splicing such fibers together and in connecting them to other devices. Stress induced birefringence is subject to relaxation as the fiber optic material flows over extended time periods to relieve the stress. Stressing a fiber to induce birefringence also often results in a fracture of the fiber in the fabrication of fiber optic devices.

SUMMARY OF THE INVENTION

The present invention includes two types of polarizing fibers suitable for use in fiber optic rotation sensing systems and in communications systems whose operational characteristics are polarization dependent. The invention also includes methods for fabricating form birefringent fibers such that the fibers have a birefringence that is stable over long periods of time and not subject to relaxation caused by the slow flowing characteristics of the supercooled liquids of which ordinary optical fibers are formed. Although the form birefringent fibers and methods of fabrication thereof are described herein with reference to single mode fibers, the invention also includes multimode fibers.

The polarizing fibers of the invention include both polarization maintaining fibers and polarizing fibers. A polarization maintaining fiber retains the polarization of an optical signal in its initial state while the signal propagates along the fiber. A polarizing fiber will propagate only a single polarization. If a signal of random polarization is input to a polarizing fiber, within a short distance only a single polarization component will exist in the fiber, all others having been removed from the polarizing fiber.

The polarization maintaining fiber has a layered core and a surrounding cladding. The core has different refractive indices for waves of different polarization so that the propagation constants of the core are polarization-dependent. The cladding has a refractive index that is less than both of the core refractive indices. It is well-known that light incident upon an interface between two dissimilar dielectrics from the material having the greater refractive index will be internally reflected if the angle of incidence is greater than a certain critical angle. Therefore, the polarization maintaining fiber guides light of both polarizations. Since the propagation constants of the core are different, or non-degenerate, energy does not readily couple between polarizations. Therefore, light propagated by the polarization maintaining fiber experiences no change in polarization.

A method of fabricating a form birefringent polarization maintaining single mode fiber according to the invention involves first forming a plurality of motifs from alternating layers of materials having different refractive indices. The motifs are then stacked and heated to form an essentially monolithic block having many alternating layers. The block may then be drawn through a succession of dies, or otherwise stretched by methods well-known in the art, to reduce the dimensions to values suitable for use as the core of an optical fiber preform that may be drawn into a fiber. Before drawing, the block may be ground to form a cylinder in order to produce a core having a circular cross section. A cladding having a refractive index less than both refractive indices of the core may be added thereto by any of several standard techniques, such as fusing bulk silicon dioxide, $SiO_2$, onto the core, collapsing $SiO_2$ tubing onto the core, or by reactive deposition of $SiO_2$ from a gaseous mixture.

The polarizing fiber also has a layered core having polarization-dependent refractive indices. The form birefringent polarizing fiber preferably has refractive indices that differ by about 0.004 for the two polarizations. The polarizing fiber differs from the polarization maintaining fiber by including a cladding having a refractive index that is greater than or equal to one of the core indices. The preferred difference in the core refractive indices permits the addition of a cladding having a refractive index greater than or equal to one of the core indices. Therefore, light of one polarization will propagate across the interface between the core and cladding while light of the other polarization is guided by the core. Therefore, the form birefringent polarizing fiber will propagate light waves of only one polarization because light having a preferred polarization remains guided by the core due to internal reflection at the core-cladding interface while light of all other polarizations radiates into the cladding. The form birefringent polarizing fiber of the invention radiates light of an undesired polarization into the cladding in a very short distance.

The polarizing fiber is formed similarly to the form birefringent polarization maintaining fiber. After the core is fused, the cladding is added by any suitable technique, such as reactive deposition in a gaseous mixture of $SiCl_4$ and $GeCl_4$.

DESCRIPTION OF THE PREFERRED EMBODIMENT

Form Birefringent Polarization Maintaining Fiber

Figure 1:
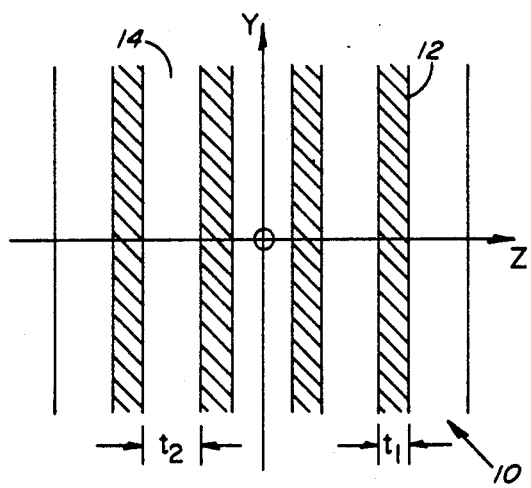
FIG. 1 is a cross sectional view representing a periodic multi-layer dielectric structure.

Referring to FIG. 1 a periodic multi-layer dielectric structure 10 comprises a plurality of alternating layers 12, 14 having different refractive indices. The layers 12 and 14 have thicknesses $t_1$ and $t_2$, respectively, that are less than the wavelength of light to be propagated therethrough. In an optical rotation sensing system (not shown) the optical wavelength is typically about 820 nm.

The refractive index of the multilayer structure 10 depends upon the polarization state of the propagating light. For simplicity, it is assumed that a plane wave linearly polarized with its electric field in the z-direction propagates along the x-axis, which points out of the plane of FIG. 1. According to well known boundary conditions on electromagnetic waves at dielectric interfaces, the normal component of the electric displacement vector, D, must be continuous such that $$D_{1z} = D_{2z} = D \quad (1)$$

and, therefore, $$\epsilon_1 E_1 = \epsilon_2 E_2 \quad (2)$$

where $\epsilon_1$ and $\epsilon_2$ are the dielectric constants of the two materials.

The average electric field over one period of the layered structure 10 is $$<E> = (t_1 D/\epsilon_1 + t_2 D/\epsilon_2)(t_1 + t_2)^{-1} \quad (3)$$

The effective dielectric constant $\epsilon_z$ for a wave polarized in the z-direction is therefore $$\epsilon_z = D/<E> \quad (4)$$

$$\epsilon_z = [(t_1 + t_2)\epsilon_1 \epsilon_2][\epsilon_2 t_1 + \epsilon_1 t_2]^{-1} \quad (5)$$

For convenience of notation, fractional thicknesses $f_1$ and $f_2$ are defined as:

$$f_1 = t_1/(t_1 + t_2) \quad (6)$$

and $$f_2 = t_2/(t_1 + t_2) \quad (7)$$

Using Equations (6) and (7) in Equation (5) gives $$\epsilon_z = (\epsilon_1 \epsilon_2)(\epsilon_2 f_1 + \epsilon_1 f_2)^{-1} \quad (8)$$

The tangential component of a wave polarized in the y-direction must be continuous so that $$E_{1y} = E_{2y} = E \quad (9)$$

The average value of the electric displacement over one period is $$<D> = (t_1 \epsilon_1 E + t_2 \epsilon_2 E)(t_1 + t_2)^{-1} \quad (10)$$

From the definition of the electric displacement, $$\epsilon_y = <D>/E \quad (11)$$

which becomes $$\epsilon_y = (t_1 \epsilon_1 + t_2 \epsilon_2)(t_1 + t_2)^{-1} \quad (12)$$

In terms of the fractional thicknesses $f_1$ and $f_2$, the dielectric constant $\epsilon_y$ for a wave polarized in the y-direction is given by $$\epsilon_y = \epsilon_1 f_1 + \epsilon_2 f_2 \quad (13)$$

Equations (8) and (13) may be used to calculate the refractive indices in the z- and y-directions. From the definition of the refractive index, $$n_z = [\epsilon_z/\epsilon_o]^{\frac{1}{2}} \qquad (14)$$

$$n_1 = [\epsilon_1/\epsilon_o]^{\frac{1}{2}} \qquad (15)$$

and $$n_2 = [\epsilon_2/\epsilon_o]^{\frac{1}{2}} \qquad (16)$$

where $\epsilon_o$ is the permittivity of free space.

Using Equations (14), (15) and (16) in Equations (8) and (13) gives $$n_z = (n_1 n_2)^{\frac{1}{2}} [n_2^2 f_1 + n_1^2 f_2]^{-\frac{1}{2}} \qquad (17)$$

and $$n_y = [n_1^2 f_1 + n_2^2 f_2]^{\frac{1}{2}} \qquad (18)$$

A birefringent crystal has an ordinary index of refraction $n_0$ and an extraordinary index of refraction $n_e$. A wave polarized along the optic axis, which is, by convention, the z-axis, encounters the extraordinary refractive index $n_e$. If the extraordinary index is greater than the ordinary index, the birefringence is said to be positive; and if the extraordinary index is less than the ordinary index, the birefringence is negative. In the present case the multilayer dielectric structure 10 has refractive indices $n_x$, $n_y$ and $n_z$ such that $$n_y = n_x > n_z \qquad (19)$$

which means that the ordinary index, $n_y$, is greater than the extraordinary index, $n_z$. Therefore, the multilayer dielectric structure 10 is analogous to a uniaxial crystal having a negative birefringence.

Equations (17) and (18) show that birefringent properties can be synthesized by properly choosing materials for the layers 12 and 14 to have particular refractive indices and by properly choosing the fractional thicknesses $f_1$ and $f_2$. The birefringence of the layered structure 10 is called "form birefringence" since the effective dielectric constant is one value for all polarizations parallel to the layers 12 and 14 and another value for polarizations normal to the layers 12 and 14. As shown in FIG. 1, the refractive index for polarization along the z-axis is less than the refractive index for polarization along the y-axis.

Figure 2:
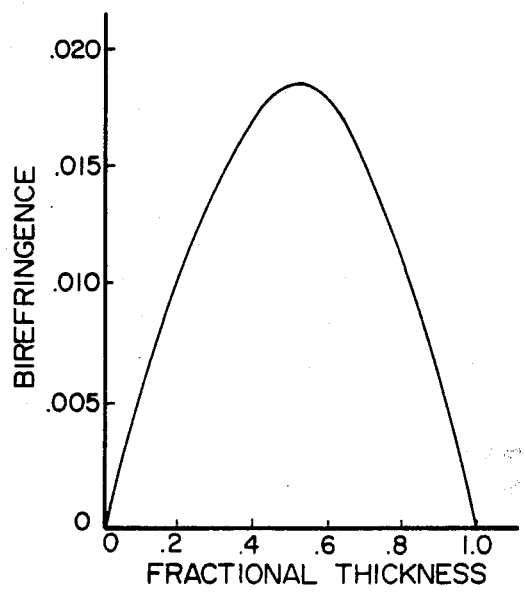
FIG. 2 is a graphical representation of the birefringence of a multi-layer stack of alternating layers of two dielectric materials.

FIG. 2 illustrates the difference $\Delta n = n_y = n_z$ of the refractive indices for ordinary and extraordinary waves as a function of the fractional thickness. The graph of FIG. 2 represents the form birefringence obtained when the layer 12 is formed of $Al_2O_3$ and the layer 14 is formed of $AlF_3$.

Figure 4:
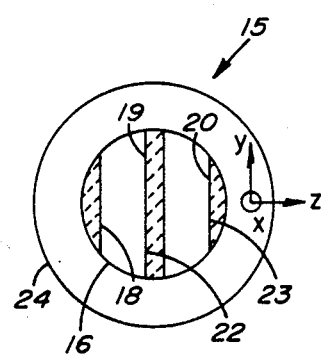
FIG. 4 is a simplified cross-sectional view of a form birefringent polarization maintaining fiber according to the invention.

Referring to FIG. 4 a form birefringent single mode fiber 15 according to the invention includes a core 16 comprised of layers 18–20 of a first material and layers 22, 23 of a second material having an index of refraction different from the first material. The core 16 may comprise many layers of the two materials, but only the five layers 18–20 and 22, 23 are shown for convenience of illustration and explanation.

The core 16 is shown to be circular in cross section, as in most optical fibers. The form birefringent single mode fiber 15 includes a cladding surrounding the core 16. The materials comprising the core 16 and cladding 24 are chosen such that the indices of refraction for polarization along the z-axis and the y-axis are greater than the index of the cladding 24. Therefore, a wave polarized along the y or z-direction input to the form birefringent single mode fiber 15 will retain its polarization in the y or z-direction.

Figure 5:
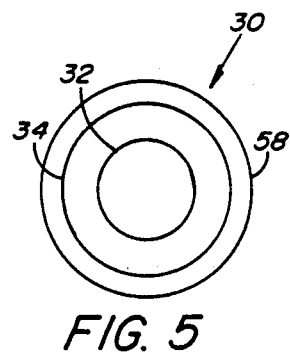
FIG. 5 is a cross sectional view of an ordinary optical fiber having a core and a cladding.

An ordinary optical fiber 30, shown in FIG. 5, has a core 32 having a refractive index greater than the refractive index of the cladding 34. The diameter of the core 32 is sufficiently small that all light propagating therein strikes the interface between the core 32 and the cladding 34 at an angle greater than the critical angle for total internal reflection. Therefore, almost all of the optical energy propagating within the fiber 30 is in the core 32.

Unlike the ordinary optical fiber 30, the form birefringent single mode fiber 15 will maintain the polarization state of a wave propagating therein. In the fiber 15 the difference between the refractive indices for the two polarizations is sufficiently large that there is a substantial difference between the propagation constants of waves having the two orthogonal polarizations. The difference between the propagation constants eliminates the degeneracy between the polarization states and prevents waves of one polarization from coupling to the other polarization under ordinary conditions. Coupling of energy between waves requires that the waves have essentially the same velocity. If the velocities are different, there is no appreciable coupling between the two states.

I. Design and Fabrication of a Submillimeter Beat Length Form Birefringent Polarization Maintaining Fiber A. Design Highly birefringent fiber is necessary for optimum spectral purity and dynamic range in several frequency shifter designs. A measure of this birefringence is the beat length, or the distance in a birefringent medium required to return initially phase matched orthogonal waves to the same phase relationship. The beat length, L, is a function of the vacuum wavelength and the refractive indices of the birefringent medium, viz.

$$L = \lambda_o/(n_y - n_z) \qquad (20)$$

where $n_y > n_z$ and $\lambda_o$ is the vacuum wavelength of the light wave. It is easily seen that for $\lambda_o = 8200$ A, $n_y = n_z$ must be greater than 0.00082 for a beat length less than one millimeter. Conventional birefringent fibers have $n_y - n_z$ values from 0.00016 to 0.00027 and beat lengths of 3 to 5 millimeters. This birefringence is ordinarily brought about by anisotropic stresses applied to the core, and application of larger stresses is impractical if the mechanical stability of the fiber is to remain.

The present invention employs the construction of a form birefringent fiber in which the birefringence is generated by juxtaposing materials with different bulk refractive indices in appropriate proportions. These parameters are related to each other by Equations (17) and (18) above.

The following describes one preferred process for producing the form birefringent core 16 meeting the above requirements. If $n_z = 1.4582$ and $n_y = 1.4592$, then the birefringence will be 0.001; and the beat length will be 0.820 millimeters at a wavelength of $0.82\mu$. This choice permits the use of fused silica ($n_1 = 1.453$) as the low index component in the form birefringent stack. If $n_1 = 1.453$, then $f_1 = 0.9578$. It then follows that $n_2 = 1.593$, and the fractional thickness $f_2 = 0.0422$. These parameters indicate the use of $GeO_2$ ($n_2 = 1.593$) as the high index component in the form birefringent stack. Both silica and germania are used in virtually all single mode and multimode fibers because of their low loss and physical compatibility. Combined inhomogenously in the given fractional thickness they form a core 16 with both $n_z$ and $n_y$ being large enough to be clad by fused silica. Thus, a form birefringent fiber with a beat length of 0.820 millimeters results which may be fabricated from two conventional low loss components, silica and germania.

To form the form birefringent polarization maintaining fiber with dimensions that are practically realizable, fabrication techniques and limitations are meshed with the precepts of form birefringence.

Because of the unwieldy dimensions of the fiber (kilometers long, microns in diameter), it is necessary that the gross dimension be suppressed until the final step of fabrication. This is conveniently accomplished by constructing a preform in which the spatial ratios, angular relationships, and refractive indices are the same as in the finished fiber produced by a succession of drawing steps well-known in the art. Preservation of these three properties in the drawing process allows the fabrication of conventional single and multimode fibers. Considering these factors, it is possible to define a core geometry and scale it to workable size.

Figure 3:
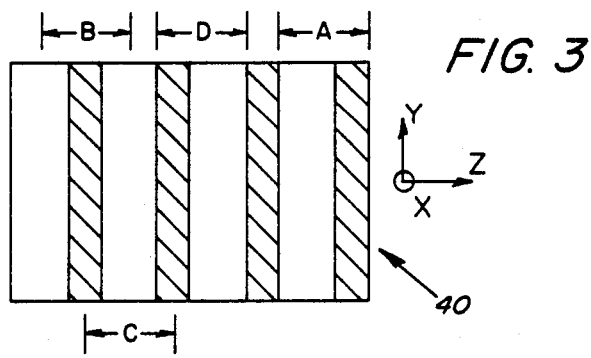
FIG. 3 is a cross sectional view of a periodic multi-layer dielectric structure formed of alternating layers of two materials having different refractive indices, illustrating the concept and placements of a motif.

For form birefringence the scale of the finished fiber must present refractive index periodicities in the core of less than the guided wavelength. The structural unit used to quantify this requirement is represented by the term "motif". The motif of a periodic structure is the smallest dimension that preserves the proportions of its constituents. The motif of the form birefringent core under discussion is then the thickness of one $SiO_2$ layer plus the thickness of one $GeO_2$ layer. A, B, C and D of FIG. 3 illustrate various placements of a motif. The length of the structure of FIG. 3 is four motifs along the z axis. As there is no periodicity along the x-axis or the y-axis, $n_z$ is the appropriate index of refraction to use in determining largest motif size, M, that would exhibit form birefringence. As was noted above, form birefringence begins to be exhibited when the motif size M is equal to or less than the optical wavelength in the material under discussion. This is called the threshold of form birefringence. Thus, the threshold of form birefringence is $$M < \lambda_0/n_z = 8200 \text{ Å}/1.4582 = 5623 \text{ Å} \quad (21)$$

The threshold of form birefringence occurs with a motif of less than 5623 Å; therefore, $$M < 5623 \text{ Å} = \lambda_z \quad (22)$$

To ensure form birefringence, M should be significantly less than the threshold, for example, $$M = \lambda_z/8 \quad (23)$$

or $$M = 703 \text{ Å} \quad (24)$$

For a final core diameter of $C = 2.8\mu$, or equivalently, 28000 Å, the core 16 then contains $C/M = 28000$ Å/703 Å = 40 motifs.

B. Fabrication

Figure 6:
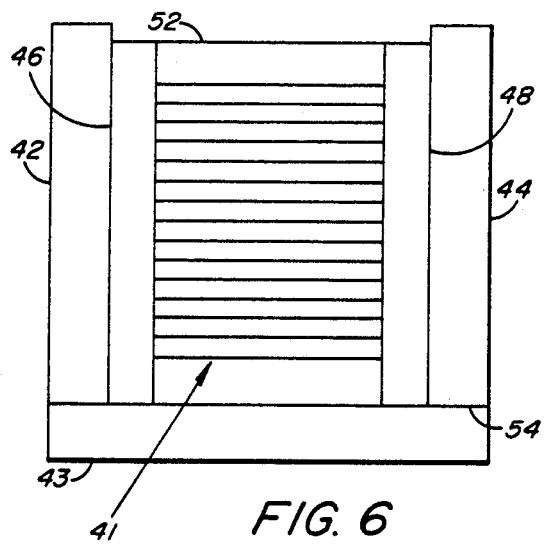
FIG. 6 is an elevation view showing fused silica casings positioned between a stack of motifs and graphite blocks.

FIG. 6 represents a stack 41 of motifs retained between a plurality of graphite blocks 42, 43, 44. The stack 41 should be supported on five sides, although only three graphite blocks are shown in FIG. 6. By setting the preform motif to 0.5 millimeters and fabricating each of the required 40 motifs as a thin rectangular plate with dimensions of $0.5 \times 20 \times 50$ millimeters, the complete core can be assembled as a rectangular solid with dimensions of $20 \times 20 \times 50$ millimeters. The $SiO_2$ component of the motif will have a thickness of $$f_1(M) = (0.9578)(0.5 \text{ mm}) = 478.9\mu \quad (25)$$

The $GeO_2$ component of the motif will have a thickness of $$f_2(M) = (0.0422)(0.5 \text{ mm}) = 21.1\mu \quad (26)$$

The volume of the core 26 so constructed is (20 mm)(20 mm)(50 mm) = 20000 mm$^3$, and is conserved during the drawing process. The length, L, of finished fiber having a square cross-section of $2.8\mu$ per side can be calculated as $$(2.8\mu)(2.8\mu)(L) = 20000 \text{ mm}^3 \quad (27)$$

which gives the result that $$L_{fiber} = 2551 \text{ km} \quad (28)$$

With about 2500 kilometers of a well defined fiber available from a single preform, prototypical instrument development and entire production runs of instruments can share the same fiber. The calculated dimensions are given for rectangular cross-sections for simplicity. A similar calculation may easily be performed for a fiber core having a circular cross-section, in which case the well-known formula for the volume of a cylinder should be used to calculate the length of the fiber core. The cylindrical fiber formed according to the process described above has a core diameter of about $2.8\mu$.

Well established optical fabrication techniques can be used to fabricate the $SiO_2$ plates from pure bulk $SiO_2$. The $GeO_2$ component may be too thin to be formed by mechanical fabrication techniques. The $GeO_2$ layer may be formed in a straight forward, but time consuming manner, well-known in the art by sputtering a $GeO_2$ film onto an $SiO_2$ substrate. The $GeO_2$ layer may also be formed by coating the $SiO_2$ with a layer of Ge and oxidizing it to $GeO_2$ in a tube furnace in a manner well-known in the art. The resulting thickness of the Ge layer is found as follows:

1 cm$^3$ of Ge weighs 5.36 gm; and oxidized to $GeO_2$ it weighs 7.72 gm.

The density of $GeO_2$ is 3.604 gm/cm$^3$; and, therefore, the $GeO_2$ volume is then 2.142 cm$^3$.

The surface area of the Ge film is fixed by the dimensions of the $SiO_2$ plates both before and after the oxidation to $GeO_2$, so that the change in volume upon oxidation changes only the thickness. If the $GeO_2$ is to be $21.1\mu$ thick, then the thickness of the Ge layer must be $(21.1\mu)(1 \text{ cm}^3/2.142 \text{ cm}^3) = 9.85\mu$. A judicious placement of the motif (corresponding to C in FIG. 3) permits the application of half of this thickness on both sides of the $SiO_2$ plate. With this choice, oxidation proceeds more quickly and the residual stresses apply equal tension to both sides of the $SiO_2$ plate. The large density of Ge provides a 5.4 kHz change per 0.1μ of Ge deposited as measured by the change in resonant frequency of a crystal thickness monitor, providing precise and accurate thickness control.

The 40 motifs are than stacked and supported on 5 sides by the graphite blocks as shown in FIG. 6. The entire assembly is placed in a furnace and heated to the softening point of GeO$_2$ and then slowly cooled to room temperature. The graphite blocks are then removed (graphite is one of the few materials to which molten glasses will not adhere), and the fused core is removed.

From this point, the remaining steps in the fabrication of the fiber preform comprise applying a suitable thickness of SiO$_2$ cladding while moving the preform aspect ratio (length of preform/diameter of preform) toward a nominal 5:1 ratio exhibited during the draw to finished fiber. If all the cladding necessary for the complete fiber were added in proportion to the fused core dimensions, the preform would be almost 60 cm in diameter but only 50 mm thick, and consequently impossible to draw.

Figure 7:
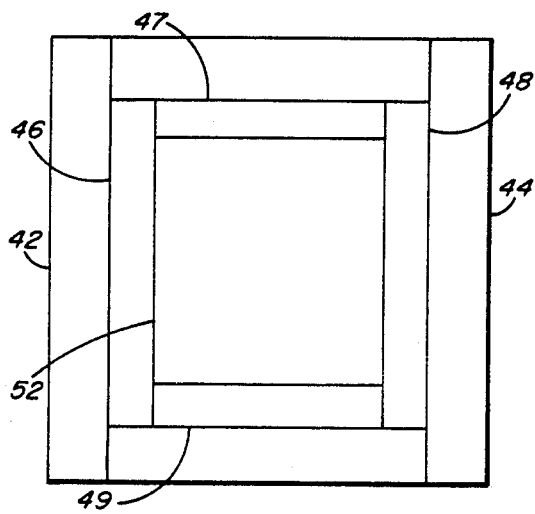
FIG. 7 is a plan view of the structure of FIG. 6.
Figure 8:
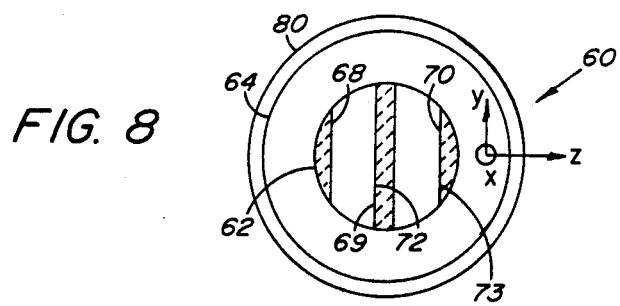
FIG. 8 is a cross sectional view of a form birefringent polarizing fiber according to the invention.

Therefore, the cladding 24 should be added after the stack 41 has been reduced to dimensions smaller than the dimensions given above. During the process of reducing the dimensions of the stack 41, it should be protected from chemical contamination and physical damage. Enough material should be provided so that the furnace temperature and draw rate may be adjusted to yield accurate and consistent core dimensions. In order to protect the stack 41 from physical damage and chemical contamination from the graphite blocks 42, 43 and 44, the stack 41 of motifs 40 which will form the core 16 may be enclosed within four fused silica casings 46, 48, 52, and 54 as shown in FIGS. 6 and 7. In order to provide adequate material for temperature and draw rate adjustments, a pair of fused silica plugs 47 and 49 are added at the ends of the core 16. The entire assembly of the stack 41 of motifs 40, the graphite blocks and the fused silica pieces are assembled as shown in FIGS. 7 and 8 prior to fusing. The probable casing plate dimensions may add approximately 10 mm to the cross section. Two of the casing plates may have dimensions of about 20 mm×5 mm×50 mm; and the other two casing plates may preferably have dimensions of about 30 mm×5 mm×50 mm. The plugs 47, 49 would match the cross section of the assembly of FIG. 7 and may preferably be about 30 mm×30 mm×50 mm. The entire assembly of the stack, the casings and the plugs is then heated while confined between the graphite blocks to form a monolith, which is then drawn down to have a cross section of approximately 3 mm×3 mm.

The cladding 24 may then be added to the core 16 by any one of several methods well known in the art of forming optical fibers, such as by fusing bulk SiO$_2$ onto the core, collapsing SiO$_2$ tubing onto the core, or by reactive deposition of SiO$_2$ from a gaseous mixture.

To simplify this discussion, the core 16 has been described as being rectangular in cross section. An advantage of the rectangular shape includes efficient butt coupling to diode coherent light sources and integrated optic circuits. However, there may be significant loss penalties with a rectangular cross section. The fused core may be centerless ground to a cylindrical shape prior to application of the cladding if a circular cross section is most desirable. The fused silica casing is then ground off as the core 16 is made cylindrical, preferably by a centerless grinding technique well known in the art.

II. Design and Fabrication of a Form Birefringent Polarizing Fiber

A. Design

The structure of a form birefringent polarizing fiber 60, shown in FIG. 8 to have a layered core 62 and a cladding 64, is similar to that of the form birefringent polarization maintaining fiber 15. The core 62 has a plurality of layers 68–70 of a first material having a first refractive index $n_1$ and a plurality of layers 72, 73 of a second material having a second refractive index $n_2$. However, as explained above, the refractive index of the cladding 64 of the form birefringent polarizing fiber 60 must be greater than or equal to one of the refractive indices of the core 62. In mathematical notation the relation between the refractive indices is $$n_y > n_c \geq n_z \tag{29}$$

where $n_y$ and $n_z$ have been previously defined and $n_c$ is the refractive index of the cladding.

It has been found that the selective guiding of one state and radiation of all others may be realized if the form birefringent core 16 has refractive indices $n_z$ and $n_y$ such that $$\Delta n = n_y - n_z = 0.004 \tag{30}$$

With $\Delta n$ having the desired value of 0.004, the refractive index $n_c$ of the cladding 64 can be made approximately equal to or slightly greater than the smaller core refractive index, $n_z$. With the refractive indices chosen as described above, the z-component of the polarization of all light input to the fiber 60 will be radiated into the cladding 64 while the y-component will be guided by the core 62 and preserved without cross-talk with the z-component.

Since the refractive indices of the form birefringent polarizing fiber 60 differ from those of the form birefringent polarization maintaining fiber 15, the motif, M, of the form birefringent polarizing fiber 60 differs from the value calculated in Equations (21)–(24) above. At the threshold of birefringence $$M < \lambda_0/n_z = 8200 \text{ A}/1.4781 \tag{31}$$

and $$M < 5548 \text{ A} = \lambda_z \tag{32}$$

To assure form birefringence, M is set well beyond the threshold with $$M = \lambda_z/8, \tag{33}$$

which gives the result that $$M = 693 \text{ A} \tag{34}$$

for a final core diameter of C=2.8μ, which is equivalent to 28000 A. The core 62 therefore contains C/M=28000 A/693 A, which gives the result that the core 62 of the form birefringent polarizing fiber 60 also contains 40 motifs.

B. Fabrication

The form birefringent polarizing fiber is fabricated in a manner similar to that described above for the form birefringent polarization maintaining fiber. The core 62 is formed from the stack 41 of forty motifs 40 that is schematically represented in FIGS. 4, 7 and 8. The dimensions of the stack 41 may be as described above with reference to the fabrication of the form birefringent polarization maintaining fiber 15. The layers 68–70 may be $SiO_2$, and the layers 72, 73 may be formed of $GeO_2$ as in the form birefringent polarization maintaining fiber 15.

In order to achieve the desired $\Delta n = 0.004$, the $SiO_2$ component of the motif 40 may have a fractional thickness $f_1 = 0.800$ while the $GeO_2$ component has a fractional thickness $f_2 = 0.200$. Therefore, the thickness of the $SiO_2$ layers 18–20 is given by $$f_1(M) = (0.800)(0.5 \text{ mm}) = 400\mu \tag{35}$$

The thickness of the $GeO_2$ component is given by $$f_2(M) = (0.200)(0.5 \text{ mm}) = 100\mu \tag{36}$$

The layers of $SiO_2$ and $GeO_2$ may be formed by any of the techniques described above with reference to the form birefringent polarization maintaining fiber 15. After the stack 41 of the motifs 40 is formed, the processes described above for the form birefringent polarization maintaining fiber 15 are followed to reduce the dimensions of the stack 41 so that it may be drawn to form the fiber core 62. The cladding must be formed to have an index of refraction greater than the refractive index of $SiO_2$. $SiCl_4$ and $GeCl_4$ both exist as vapors that may be oxidized to a mixture of $SiO_2$ and $GeO_2$ by a methane/oxygen flame. The refractive index of the resulting mixture depends upon its molar composition. Therefore control of the flow rates of the $SiCl_4$ and the $GeCl_4$, permits the deposition of a soot consisting of 82.28 mol % $SiO_2$ and 17.72 mol % $GeO_2$ on the core to form the cladding. The refractive index of the cladding will then be equal to $n_z$ in the core.

The cladding 64 which is to be added to the core 62 must have a refractive index that is greater than or equal to the refractive index of $SiO_2$. The cladding 64 may be added by oxidizing a mixture of $SiCl_4$ and $GeCl_4$ vapors in a methane/oxygen flame. The refractive index of the resulting mixture depends upon the molar composition thereof. Therefore, control of the flow rates of the $SiCl_4$ and $GeCl_4$ vapors permits the deposition of a soot consisting of 82.28 mole % $SiO_2$ and 17.72 mole % $GeO_2$ on the core 62 to form the cladding 64. The refractive index of the cladding 64 formed according to this process will be equal to $n_z$ in the core 62.

In accordance with the above-described process steps a single mode form birefringent polarizing fiber 60 may be formed to have the specifications given in Table 1 below.

TABLE 1

| POLARIZING FIBER SPECIFICATIONS | | |
|---|---|---|
| core composition | $f_1 = 0.800$ ($SiO_2$) | $f_2 = 0.200$ ($GeO_2$) |
| core indices | $n_z = 1.4781$ | $n_y = 1.4821$ |
| cladding composition | 82.28 mol % $SiO_2$ | 17.72 mol % $GeO_2$ |
| cladding index | 1.4718 | |
| core diameter | $2.8\mu$ | |
| V number | 1.2519 | |

The V number of an optical fiber is $$V = k\rho(n^2_{core} - n^2_{cladding})^{\frac{1}{2}} \tag{37}$$

where $k = 2\pi/\lambda_o$ is the wave number, with $\lambda_o$ being the wavelength of the light signal in vacuum, and $\rho$ is the core radius. The V number is the criterion for determining whether a fiber will propagate only a single mode of electromagnetic energy of a particular frequency, or whether the fiber will propagate a multiplicity of modes. It has been found for a cylindrical core that if $V < 2.405$, for a given set of parameters in Equation (37), then the fiber is a single mode fiber. Lowering the V number increases the magnitude of the evanescent field and decreases the field in the core of light guided by the fiber. The doping of $GeO_2$ is heavier in the core 62 than in the cladding 64. Since $GeO_2$ is the primary scattering agent in the fiber 60, increasing the evanescent field and decreasing the field in the core 62 reduces scattering, which causes part of the signal to be coupled into the cladding 64. Therefore, the form birefringent polarizing fiber 60 is formed to have a relatively low V number.

All information carried by any optical fiber is transported by the propagation of light. Through several mechanisms, part of the light guided by the core 62, for example, escapes therefrom. If the intensity of the escaped light is not suppressed, it will propagate along the fiber 60 as cladding modes. Cladding modes are uncorrelated to the information contained in the light guide by the core 62 and are considered to be noise. Over the length of the fiber 60 a portion of the cladding modes tends to couple back into the core 62 and compromise the integrity of the information in the light guided by the core 62. If the output of the fiber 60 is incident upon a detector (not shown), the detector will respond to both the light guided by the core 62 and the noise carried in the cladding modes.

Conventional single mode and multimode fibers, such as the fiber 30 of FIG. 6, are jacketed with a soft plastic material 76 to protect the fragile glass fiber 30 from breakage under mechanical stress. This coating is ordinarily transparent or translucent and has a refractive index greater than the refractive index of the cladding 34 of the fiber 30. The relation between the refractive indices of the cladding 34 and the jacket material 76 allows radiation modes to to stripped form the cladding 34. In most cases of conventional jackets, tens of meters of length of the fiber 30 are required for the mode stripping to be effective.

It has been found that rapid attenuation of the radiation modes enhances the effectiveness of the form birefringent polarizing fiber 60 in propagating only a single polarization regardless of the polarization of the signal input thereto. Since the mechanisms that produce noise in the fiber 60 are distributed along its length, the noise should be suppressed in the minimum possible length to minimize the deleterious effects of noise on signal integrity. Therefore, in order to increase the signal/noise ratio of the fiber 60, an absorbing jacket 80 may be added around the cladding as shown in FIG. 8. The absorbing jacket 80 preferably comprises an opaque substance, such as finely divided carbon black in a high refractive index plastic matrix in order to absorb the cladding modes within distances of a few centimeters along the length of the polarizing fiber 60. The absorbing layer 64 may be formed by adding carbon black to conventional jacketing materials.

What is claimed is:

1. A polarizing fiber optic waveguide, comprising:
   a core formed of a plurality of alternating dielectric layers, each layer having a characteristic refractive index, said core being formed such that the dielectric layers provide a first core refractive index for light of a first polarization and a second core refractive index for light of a second polarization; and a cladding surrounding said core, said cladding being formed of a dielectric material having a refractive index at least as large as said first core refractive index and less than said second core refractive index such that said core guides only light of said second polarization and light of all other polarizations propagate from said core into said cladding.

2. The polarizing fiber optic waveguide of claim 1 wherein said core has diameter such that only a single mode of optical energy will be guided by said core.

3. The polarizing fiber optic waveguide of claim 1 wherein said core is formed of alternating layers of $SiO_2$ and $GeO_2$.

4. A method for forming a polarizing fiber optic waveguide, comprising the steps of:

forming a core of a plurality of alternating dielectric layers, each layer having a characteristic refractive index, the alternating dielectric layers providing a first core refractive index for light of a first polarization and a second core refractive index for light of a second polarization; and surrounding the core with a cladding formed of a dielectric material having a refractive index at least as large as the first core refractive index and less than the second core refractive index such that the core guides only light of said second polarization and light of all other polarizations propagate from the core into the cladding.

5. The method of claim 4 wherein the forming step includes:

forming a plurality of alternating layers of $SiO_2$ and $GeO_2$;

stacking a plurality of the layers; and supporting the stacked layers with graphite blocks.

6. The process of claim 4 further including the step of encasing the stack of layers in fused silica before heating to form a monolith.

7. The method of claim 4 wherein the drawing step includes drawing the structure through a plurality of rectangular dies.

8. The method of claim 4 further including the step of grinding the monolith into a cylinder.

9. The method of claim 8 wherein the drawing step further includes drawing the cylinder through a series of circular dies.

10. The method of claim 9 further including the step of covering the core with a cladding having a cladding refractive index less than the refractive indices of the core.

11. The method of claim 9 further including the step of covering the core with a cladding having a cladding refractive index that is at least as great as one of the refractive indices of the core.

12. The method of claim 4 further including the step of compressing the structure to reduce the thickness of the layers to predetermined thicknesses.

13. The method of claim 9 further including the step of grinding the monolith into a cylinder.

14. The method of claim 10 wherein the drawing step further includes drawing the cylinder through a series of circular dies.

* * * * *